(12) United States Patent
Goto et al.

(10) Patent No.: US 6,339,602 B1
(45) Date of Patent: Jan. 15, 2002

(54) METHOD OF GENERATING PLURAL PULSE LIGHTS AND APPARATUS THEREFOR

(75) Inventors: Toshio Goto, Nisshin; Norihiko Nishizawa, Nagoya, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/492,323

(22) Filed: Jan. 27, 2000

(51) Int. Cl.$^7$ .................................................. H10S 3/30
(52) U.S. Cl. .................................. 372/6; 372/6; 372/25; 372/27; 372/106
(58) Field of Search .............................. 372/6, 27, 106, 372/25, 26

(56) References Cited

U.S. PATENT DOCUMENTS

| | | | |
|---|---|---|---|
| 5,880,877 A | | 3/1999 | Fermann et al. |
| 6,014,249 A | * | 1/2000 | Fermann et al. ............. 359/341 |
| 6,208,458 B1 | * | 3/2001 | Galvanauskas et al. ..... 359/345 |
| 6,275,512 B1 | * | 8/2001 | Fermann ........................ 372/6 |

OTHER PUBLICATIONS

N. Norihiko, R. Okamura, and T. Goto, "Simultaneous Generation of wavelength tunable two colored femtosecond soliton pulses using optical fibers" IEEE Photonics Technology Letters, vol. 11, No. 4, Apr. 1999, pp. 421–423.*

P. Beaud et al., "Ultrashort Pulse Propagation, Pulse Breakup, and Fundamental Soliton Formation in a Single–Mode Optical Fiber", IEEE Journal of Quantum Electronics, vol. QE–23, No. 11, Nov. 1987, pp. 1938–1946.

* cited by examiner

Primary Examiner—Frank G. Font
Assistant Examiner—Delma R. Flores Ruiz
(74) Attorney, Agent, or Firm—Burns, Doane, Swecker & Mathis, LLP

(57) ABSTRACT

An apparatus for generating plural pulse light beams includes a polarization maintaining fiber operating as a plural pulse light generating device. When a short pulse light beam is launched into the polarization maintaining fiber from a fiber laser source, two polarized components of the light beam are generated in the polarization maintaining fiber and perpendicularly intersect each other. Then, the resulting induced Raman Effect and Soliton Effect relative to each polarized component of the light causes a soliton pulse having a wavelength longer than the corresponding component.

12 Claims, 4 Drawing Sheets

METHOD OF GENERATING PLURAL PULSE LIGHTS AND APPARATUS THEREFOR

This application is based on and claims priority under 35 U.S.C. § 119 with respect to Japanese Application No. 11(1999)-17295 filed on Jan. 26, 1999, the entire content of which is incorporated herein by reference.

FIELD OF THE INVENTION

The present invention is generally related to lasers. More particularly, the present invention pertains to a method and apparatus for generating plural pulse lights.

BACKGROUND OF THE INVENTION

Recently, as evidenced by U.S. Pat. No. 5,880,877 issued to Fermann, et al., a short pulse laser has been realized using a fiber laser. In addition, launching a short pulse light into an optical fiber causes a new pulse at a longer wavelength side of the short pulse light. This has been reported by P. Beaud, et al.(IEEE J. of Quantum Electronics vol. 23, Issued 1987, page 1988.

In certain fields and applications, a need exists for plural short pulse lights which are different in wavelength. However, it is quite difficult, if not impossible, to meet this need using the foregoing proposals or a combination of the foregoing proposals.

A need thus exists for a method and apparatus capable of generating plural short pulse lights.

SUMMARY OF THE INVENTION

The present invention provides a method and apparatus for generating plural pulse lights by Induced Raman Effect (Raman scattering) when a short pulse light from a short pulse generation device such as a fiber laser source is launched Into a polarization maintaining fiber.

In the present invention, the short pulse light launched obliquely into the polarization maintaining fiber generates in the fiber two polarized components of the light which perpendicularly intersect each other. Alternatively, before launching the short pulse light, the short pulse light can be decomposed into two polarized components of different phase which intersect at right angles. In addition, the launched short pulse light can be of circular polarization or elliptical polarization.

Then, the resulting induced Raman Effect and Soliton Effect relative to each polarized component causes a soliton pulse which is longer in wavelength than the corresponding component, subject to that the incident angle of the short pulse light is inclined to the incident side of the polarization maintaining fiber. Alternatively, the two polarized components of the light which perpendicularly intersect each other can be obtained before the light is launched into the polarized maintaining fiber.

In addition, the polarization maintaining fiber is designed to have a sufficient energy intensity which by the Raman Effect allows each polarized component of the light to cause a longer wavelength short pulse light at a longer wave side of the light.

Thus, two short pulse lights can be obtained with a relatively simply constructed apparatus.

It is preferable to employ a fiber laser source as the short pulse generation device. This fiber laser source is able to emit a short pulse light whose pulse width is on the femtosecond order. However, other devices capable of emitting a short pulse light with sufficient energy intensity can also be employed.

The above mentioned energy intensity is represented as a function of time or a spectrum shape, which means that varying this shape causes a variation of the energy intensity. In other words, the two longer wavelength lights can be generated by way of holding the energy intensity of an area of each of the two polarized components of the light above a threshold value for a particular time duration.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
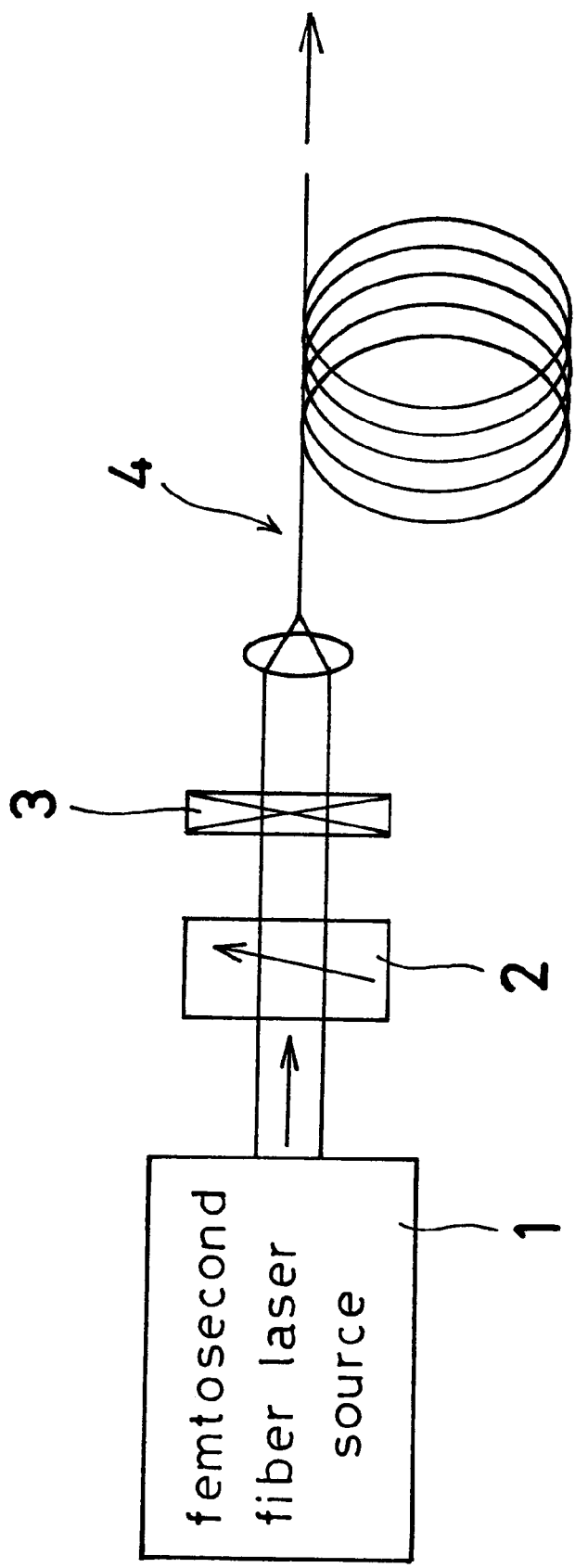
FIG. 1 is a schematic illustration of an apparatus for generating plural pulse lights in accordance with an embodiment of the present invention.

Referring initially to FIG. 1, an apparatus according to one embodiment of the present invention for generating plural pulse lights includes a short pulse source or a fiber laser source 1 which generates a light of femtosecond short pulses, a variable attenuation device 2 which adjusts the density of the light emitted from the fiber laser source 1, a half-wave plate 3 which changes the polarization state of the light from the variable attenuation device 2, and a constant deviation reservation fiber or polarization maintaining fiber 4 which conserves or maintains the deviation surface or polarization of the light emitted from the half-wave plate 3. The fiber laser source 1, the attenuation device 2, and the half-wave plate 3 constitute a short pule generation device, while the polarization maintaining fiber 4 constitutes a plural pulse lights generating device.

As the fiber laser source 1, a commercially available device having the following rating or characteristics is preferably employed. The device is one supplied by IMRA America Inc.

Code: femtolite 780
Item No.: FL1550/30SA
Wavelength: 1560 nm
Pulse Width: less than 180 fs
Output Power: 37 mW
Repetition Rate: 48.9 MHz The attenuation device 2 is preferably comprised of a half-wave plate (for example, one supplied from Suruga Seiki Co. Ltd under the Item code of S33-1550-2) and a subsequent polarization beam splitter (for example, one supplied from Sigma Kohki Co. Ltd under the item code of PBS-15-1550). The half-wave plate 3 is preferably the same as the half-wave plate used in the attenuation device 2.

The polarization maintaining fiber 4 preferably has the following rating or characteristics.
Core Diameter: 5.5±0.5 μm
Optical Loss: 2.65 dB/km (in case of 1550 nm light)
Length: 110 mn The polarization maintaining fiber 4 possesses double refraction or birefringence characteristics so that the polarization components of the light which cross each other at right angles move or travel independently at different speeds. When the intensities of the polarization components of the light becomes greater than equal to respective threshold values, due to induced Raman Effect and Soliton Effect, at the longer wavelength side of the light two soliton pulses are generated.

Each of the soliton pulses has a tendency to shift to the longer wavelength side of the short pulse light as the length of the polarization maintaining fiber 4 increases and/or the intensity of the short pulse light increases. Thus, a combination of the two soliton wavelengths can be combined at any desired rate by an adjustment of the intensities of the two polarization components of the light which results from varying the intensity of the short pulse light and/or the polarization direction. Any one of the following three ways can be employed to generate the soliton pulse light and considering the extent to which the wavelength of the soliton pulse light has to be changed.

1. Adjusting the intensity of the light emitted from the fiber laser source 1.
2. Changing the attenuation factor of the attenuation device 2.
3. Varying the angle between the double refraction axis of the half-wave plate 3 and the polarization direction of the light which is incident to an incident plane thereto.

In the present embodiment, the polarization directions of the short pulse light which is launched into the fiber 4 are rotated through an angle by using the half-wave plate of the attenuation device 2. Prior to this, the polarization directions of the short pulse light are made parallel to horizon after passing through the beam splitter of the attenuation device 2, and the polarization directions of the short pulse light are maximized in intensity when the light is launched into the fiber 4 subject to the nonexistence of the half-wave plate 3.

Experiments were performed by changing the angle θ defined between the polarization direction of the short pulse light and the birefringence axis, with the intensity of the short pulse light inputted to the incident side of the fiber 4 being set at 11.2 mW, the pulse width of the short pulse light inputted to the incident side of the fiber 4 being set at 180 fs, and the length of the fiber 4 being set at 110 m. The results are set forth in FIG. 2.

Figure 2:
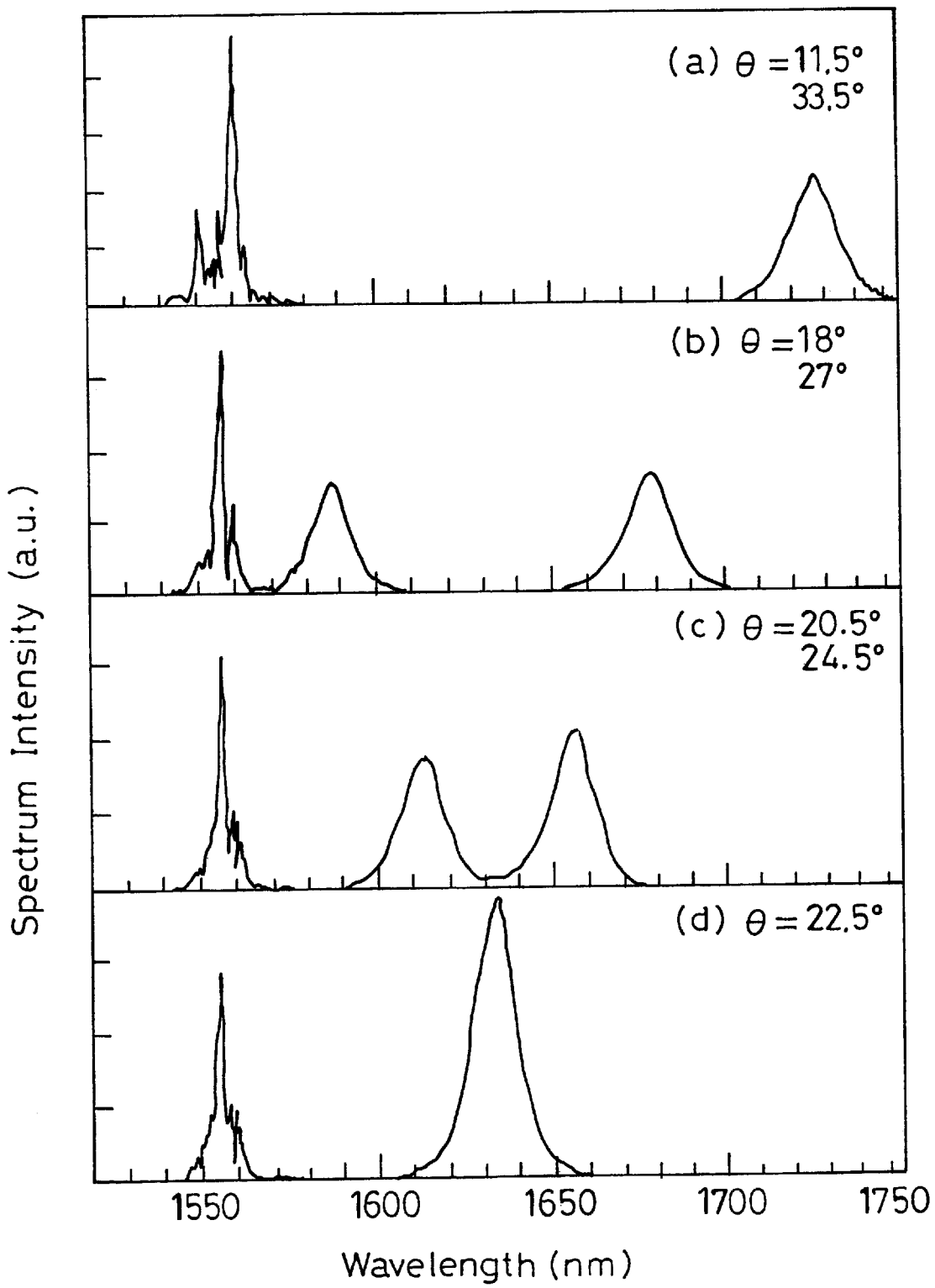
FIG. 2 is a graph depicting how the two polarization components of the light appear.

When the angle θ of the incident angle is 11.5° due to the fact that the polarization direction of the light is parallel to the X-axis, a sole soliton pulse is generated and shifted from the light through a large wavelength as shown in FIG. 2(*a*).

As the angle θ of the incident angle approaches 22.5° the intensity of the x-directional component of the polarization direction of the light decreases, thereby increasing the intensity of the y-directional component of the polarization direction of the light. Thus, the wavelength of the soliton pulse biased in the x-direction shifted toward the short wavelength side of the light and when the intensity of the y-directional component of the polarization direction of the light which is in increasing state exceeds a specific value, a new soliton pulse is generated which is polarized in the y-direction when θ is 18° (FIG. 2(*b*)). These soliton pulses follow an ideal configuration or spectrum which is very close to the Fourier limit.

As the angle θ of the incident angle further approaches the value of 22.5°, one of the two Soliton pulses comes close to the other when θ is 20.50° as depicted in FIG. 2(*c*), and immediately when the angle θ of the incident angle becomes 22.5° the two soliton pulses are in coincidence with each other as shown in FIG. 2(*d*).

As a result of further increasing the angle θ of the incident angle, when the angle θ becomes 24.5°, 27° and 33.5°, the results shown in FIG. 2(*c*), FIG. 2(*b*), and FIG. 2(*a*), respectively are obtained, wherein the right-sided soliton pulse is the one indicating the soliton pulse polarized in the y-direction.

Figure 3:
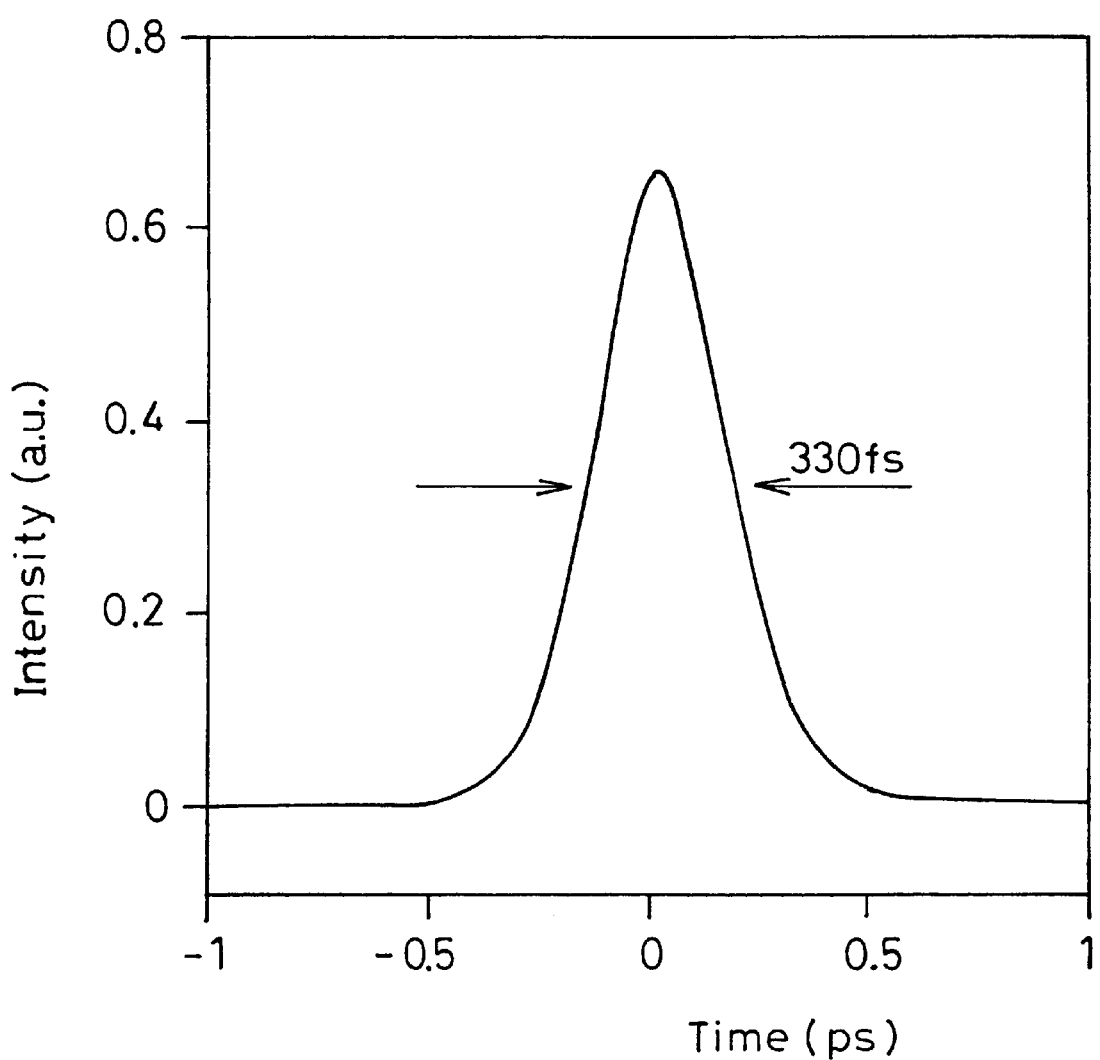
FIG. 3 is a graph of intensity versus time illustrating a profile of the spectrum of the autocorrelation function of the soliton pulse generated in the apparatus shown in FIG. 1.

FIG. 3 indicates a measured result of the wave-shape of the autocorrelation function of the x-direction polarized soliton pulse when the light is launched into the incident side of the fiber 4 under the condition that the intensity of the light is 11.2 mW and the angle θ is 20.5°. At this measurement, the wavelength of the x-direction polarized soliton pulse is 1654 nm, while the wavelength of the y-direction polarized soliton pulse is 1613 rm. In this measurement, only the x-direction polarized soliton pulse is eliminated by using the polarizing beam splitter so that the y-direction polarized soliton pulse is eliminated. FIG. 3 indicates that the autocorrelation function of the x-direction polarized soliton pulse is smooth without skirts at both sides. The measured wavelength of the x-direction polarized soliton pulse is found to be substantially identical with that of the pulse from the laser fiber source 1. The half-width of the autocorrelation function of the x-direction polarized soliton pulse is measured to be 330 fs and the pulse width of this soliton pulse is estimated to be 210 fs. The pulse width of the soliton pulse found to be independent of the incident intensity of the light.

Figure 4:
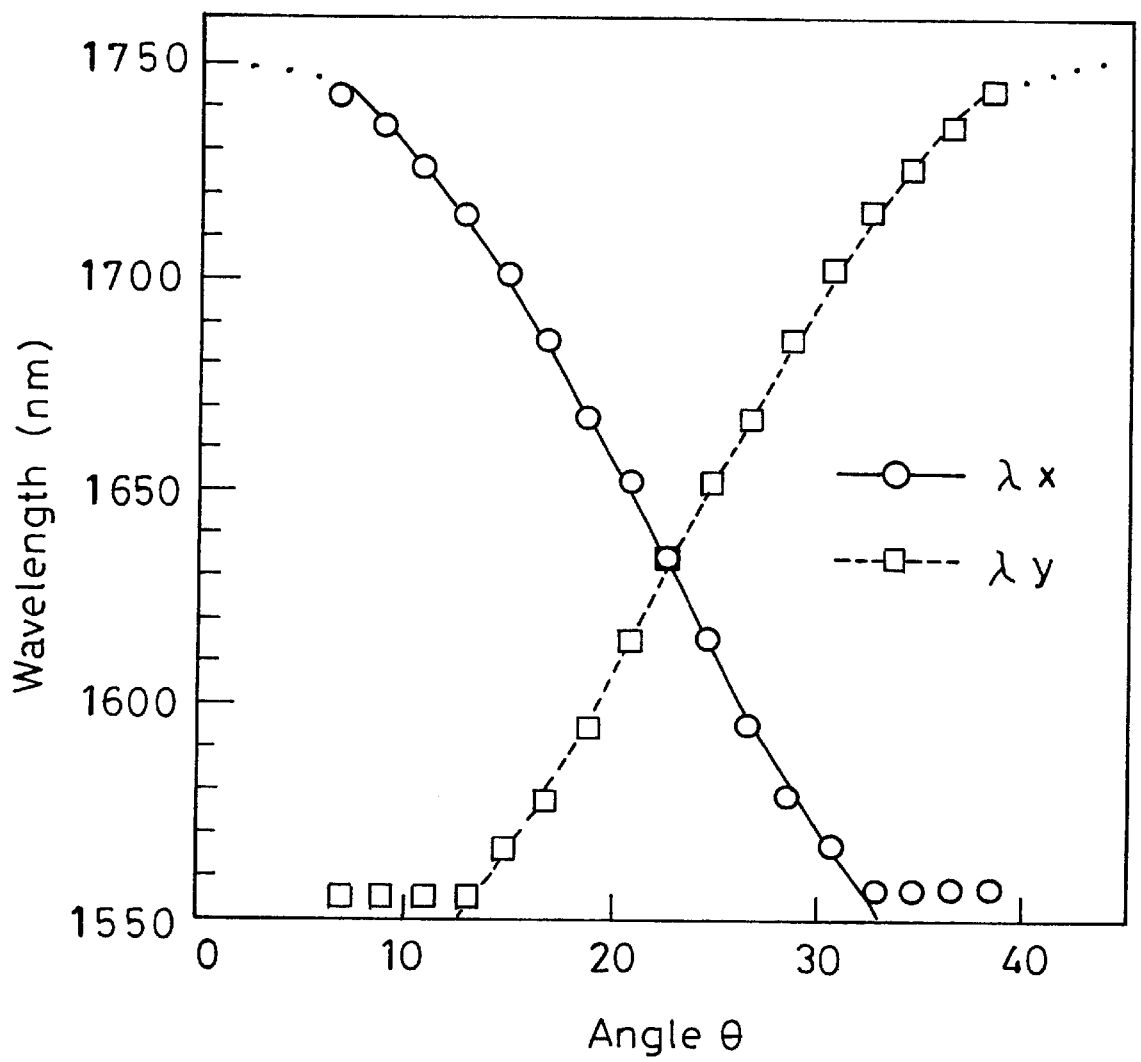
FIG. 4 is a graph indicating the relationship between the wavelength of the soliton pulse and the angle of a half-wave plate.

FIG. 4 shows the relationship between the angle θ and each of the two soliton pulses. As shown in FIG. 4, changing the value of the angle θ changes the wavelength of the soliton pulse consecutively and linearly. It is to be noted in FIG. 4, the solid line indicates the calculated wavelength of the x-direction polarized soliton pulse, the open circles indicate each value of the measured wavelength of the x-direction polarized soliton pulse, the dotted line indicates the calculated wavelength of the x-direction polarized soliton pulse, and the open squares indicate each value of the measured wavelength of the y-direction polarized soliton pulse. Each wavelength of the soliton pulse varies in linear mode above the threshold value relative to the intensity of the corresponding polarized direction component.

According to a second embodiment of the present invention, changing the length of the fiber 4 causes a variation of the wavelength of the soliton pulse. Thus, preparing fibers 4 of different lengths makes it possible to change the wavelength of the soliton pulse by launching the light emitted from the half-wave plate 3 into any one of the plural fibers 4.

In accordance with a third embodiment of the present invention, changing the intensity of the short pulse light can be established by either of a combination of a fiber laser source emitting a fixed intensity of light and a variable attenuation device, changing the intensity of the light emitted from the fiber laser source 1, and changing the angle between the incident side of the fiber 4 relative to the axis of the light emitted from the fiber laser source 1. These different ways allow at least one of the half-wave plate 3 and the attenuation device 2 to be omitted.

According to a fourth embodiment of the present invention, the half-wave plate 3 can be rotated by a mechanism. The mechanism can be either manually operated or electrically operated and, if possible, can preferably be provided with a locking mechanism for retaining the set rotational or angular position of the half-wave plate 3.

According to a further embodiment of the invention, instead of the variable attenuation device 2, a neutral density filter can be employed to gradually vary the light intensity.

Another version of the present invention involves a direct coupling of the fiber laser source 1 with the fiber 4. With this version, the generation of each of the plural soliton pulses and the adjustment of each wavelength thereof have to be made by changing the light emitted from the fiber laser source 1. Changing the light emitted in this way is established by adjusting the pumping energy of a laser oscillator or an amplifier.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An apparatus for generating plural pulse lights comprising:

a plural pulse light generating device including a polarization maintaining fiber having a predetermined length;

a short pulse generation device emitting a short pulse light, the short pulse generation device being arranged so that the short pulse light is launched into an incident side of the polarization maintaining fiber so as to travel both in a birefringence axis direction of the polarization maintaining fiber and in a direction perpendicular to the birefringence axis direction of the polarization maintaining fiber, with light intensities of two polarized components of the short pulse light in the polarization maintaining fiber being stronger than those of long wave short pulse light, the wave length of which are longer than that of the short pulse light.

2. An apparatus as set forth in claim 1, wherein the long wave short pulse light generated at the polarization maintaining fiber is a soliton pulse light.

3. An apparatus as set forth in claim 2, wherein the short pulse generation device includes a wavelength varying element which varies the wavelength of the long wave short pulse light.

4. An apparatus as set forth in claim 3, wherein the wavelength varying element includes an element which varies a shape of a spectrum of the short pulse light which is a function of time.

5. A apparatus as set forth in claim 1, wherein the plural pulse light generating device includes a wavelength varying device which varies the wavelength of the long wave short pulse light, the wavelength varying element having a plurality of other polarization maintaining fibers that differ according to at least one of length, core diameter, composition, and wavelength dispersion characteristics, and a switching device to launch the short pulse light emitted from the short pulse generation device to any one of the polarization maintaining fibers.

6. An apparatus as set forth in claim 1, wherein the short pulse generation device includes a wavelength varying element which varies the wavelength of the long wave short pulse light.

7. A method of generating plural pulse light comprising:

launching short pulse light through use of a short pulse generation device into a short pulse generation device that includes a polarization maintaining fiber having a predetermined length so that the short pulse light is launched into an incident side of the polarization maintaining fiber and travels both in a birefringence axis direction of the polarization maintaining fiber and in a direction perpendicular to the birefringence axis direction of the polarization maintaining fiber; and controlling light characteristics of two longer wavelength short pulse light in such a manner that light intensities of two polarized components of the short pulse light in the polarization maintaining fiber are larger than threshold values, at each of which another short pulse light is generated which is longer in wavelength than the short pulse light.

8. A method as set forth in claim 7, wherein the polarization maintaining fiber generates a soliton pulse as the longer wavelength short pulse light.

9. A method as set forth in claim 8, wherein the short pulse generation device includes a wavelength varying element which varies the wavelength of the longer wavelength short pulse light.

10. A method as set forth in claim 9, wherein the wavelength varying element includes an element which varies a shape of a spectrum of the short pulse light which is a function of time.

11. A method as set forth in claim 7, wherein the short pulse generation device includes a wavelength varying element which varies the wavelength of the longer wavelength short pulse light.

12. A method as set forth in claim 7, wherein the plural pulse light generating device includes a wavelength varying device which varies the wavelength of the longer wavelength short pulse light, the wavelength varying element having a plurality of other polarization maintaining fibers, the polarization maintaining fibers differ with respect to at least one of length, core diameter, composition, and wavelength dispersion characteristics, and a switching device to launch the short pulse light emitted from the short pulse generation device to any one of the other polarization maintaining fibers.

* * * * *

UNITED STATES PATENT AND TRADEMARK OFFICE
CERTIFICATE OF CORRECTION

PATENT NO. : 6,339,602 B1
DATED : January 15, 2002
INVENTOR(S) : Toshio Goto et al.

It is certified that error appears in the above-identified patent and that said Letters Patent is hereby corrected as shown below:

<u>Title page,</u>
Insert the following information:
-- [30]      Foreign Application Priority Data
    January 26, 1999  (JP)   ………………  11-017295 --

Signed and Sealed this

Twentieth Day of August, 2002

Attest:

JAMES E. ROGAN
Attesting Officer       Director of the United States Patent and Trademark Office